EMPLOYEE CARD SENSING AND RECORDING DEVICE

Filed April 4, 1967

INVENTORS
MITITAKA YAMAMOTO
YUKIO MIZUTA
SHIZUYA ANO
BY
Christensen, Sanborn, & Matthews
ATTORNEYS INVENTORS
MITITAKA YAMAMOTO
YUKIO MIZUTA
SHIZUYA AND
BY
Christensen, Sanborn & Matthews
ATTORNEYS United States Patent Office 3,419,881

Patented Dec. 31, 1968

3,419,881

EMPLOYEE CARD SENSING AND RECORDING DEVICE

Mititaka Yamamoto, 17 Ryoanji Gotanda-cho, Ukyo-ku, Yukio Mizuta, 68 Mukaijima Ninomaru-cho, Fushimi-ku, and Shizuya Ano, 172–9 Uguisudai, Nagaoka-cho, Otokuni-gun, all of Kyoto, Japan Filed Apr. 4, 1967, Ser. No. 628,474

Claims priority, application Japan, Apr. 6, 1966, 41/21,865

3 Claims. (Cl. 346—42)

ABSTRACT OF THE DISCLOSURE

This invention provides a recording control apparatus which is adapted to be installed at an entrance and exit of an office, manufacturing plant, laboratory or such other places, and which is capable of automatically and selectively recording various items of information about the passage of employees through the gateway, such as the identification number of each employee, the time at which each passage occurred, the number of hours of overtime work, and so forth. Schematic circuit diagrams are provided which disclose the details of one preferred system making use of employee identification cards and justification or reason cards selectively used therewith when an employee passes through the entrance or exit.

In order to collect and record such items of information, it has been customary to use a time recorder so that as each employee passes through the gate, he or she inserts his or her identification card into the recorder, which prints the instant time on the card. Such records on the cards are periodically collected for use as a basis for payroll calculations and other purposes. With prior art time recorders, every passage through the gateway is recorded together with its time. Indeed, it is necessary to record the time of passage through the gateway by an employee who comes later or leaves earlier than usual, but it will not be necessary to record the identification number or time when an employee passes through the gateway for a justifiable reason, such as "going out on business."

Accordingly, the primary object of the invention is to provide a recording control apparatus which is capable of automatically selecting only the necessary items of information about the passage of employees through the gateway and recording them, omitting those items of information from record which are not necessary for the purpose of management.

In accordance with the invention, when an employee is going to pass through the gateway before or after the working hours, or during the working hours but with a justifiable reason such as going out on business, his or her identification card only is checked with respect to its genuineness and his or her passage through the gateway is permitted depending upon the result of the checking, but no recording of the identification number and time is made. On the other hand, when an employee is going to pass through the gateway during the working hours without any justifiable reason, that is, he is coming to work later or leaving work earlier than usual, or when an employee is going to pass through the gateway before or after the working hours for a justifiable reason, for example, overtime work, the identification card is checked with respect to its genuineness so as to determine whether the passage be permitted, depending upon the result of the checking, and at the same time, the necessary items of information as well as the identification number are recorded. Thus, in accordance with the invention, recording is limited to these items of information necessary for management and supervision purposes, so that posterior handling of the recorded data is much simplified.

When a passage through the gateway is made for a justifiable reason, a justification or reason card must be used in addition to an identification card. There may be as many kinds of reason cards as occasions demand, such as one for a business outing, or for overtime work; and these kinds are distinguished by different code characteristics afforded to them. On each reason card for overtime work the number of hours of the overtime work is recorded by any suitable means such as coded punched holes.

The invention will be fully understood by reading the following description of a preferred embodiment thereof with reference to the accompanying drawings, wherein:

FIG. 1 schematically shows an identification or reason card employed in the apparatus of the invention;

Figure 1:
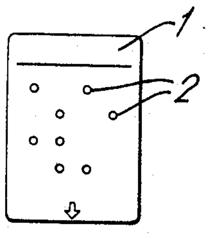
Figure 3:
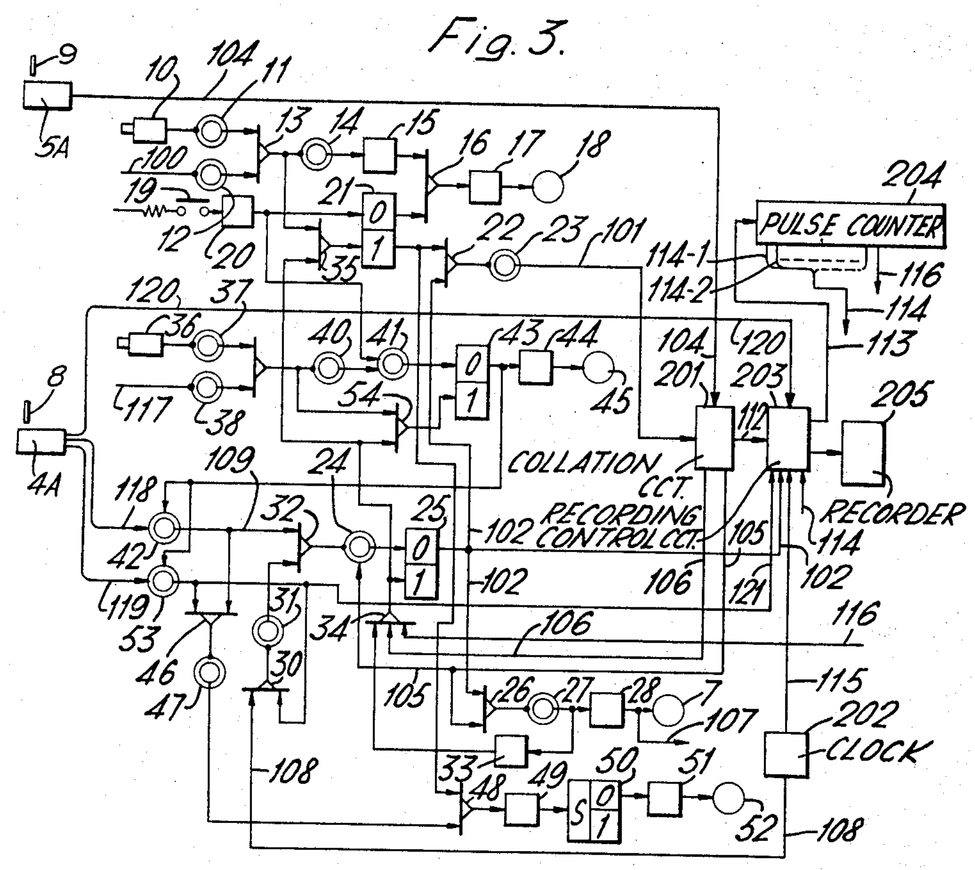
FIG. 3 is a circuit diagram of the apparatus of the invention.

Referring now in detail to FIG. 1, there is shown a card which represents the justification or reason card 8 of FIGURE 3 as well as an employee identification card 9 of FIGURE 3. The cards are shown as having a section 1 and a plurality of punched holes 2. The same type of card is conveniently used for the various purposes indicated above and explained in greater detail hereinafter. In the case of the card of FIGURE 1 being used as an identification card, then in the section 1, the name and identification number of the bearer are written and below the section, the identification number is encoded by means of the punched holes.

As previously mentioned, in some cases, the identification card must be accompanied by a justification or reason card, which is of a similar construction. That is, in the upper section of the reason card, the reasons that justify unusual passages through the gate, such as a business outing, overtime work, etc., and in the case of overtime work the number of hours are written and, below the section, these items of information are encoded by punched holes. The punched holes may be replaced by any other suitable recording medium, such as magnetic inked symbols.

Figure 2:
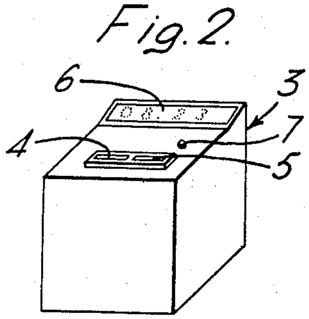
FIG. 2 is a schematic perspective view of a card reader employed in the apparatus of the invention.

A card reader 3, schematically shown in FIG. 2, is installed at the gate through which employees pass. A pair of such card readers may preferably be provided at the gate, one for entrance and the other for exit only. The card reader 3 has a pair of slots 4 and 5, one of which, say, 5 receives the identification card and the other 4, the reason card. In FIGURE 3 the reason card reader and the identification card reader are shown as the separate card readers 4A and 5A. The card reader is also provided with a window 6 in which figures expressing the instant time appear; and a lamp 7 adapted to light on when an identification card inserted into the slot 5 has been recognized as genuine, and off when the checking of the card or the data recording has been finished. Inside the card reader, a light source and a plurality of photodetectors, not shown, are arranged so that the light passing through the punched holes of an inserted card is sensed by the photodetectors. The information on the card can be read through the electrical output signals of the photodetectors, as will be described later in detail.

When employees enter or exit through the gate before or after the working hours, they are supposed to insert their respective identification cards only into the slot 5 of the card reader. As a test of genuineness, the cards are provided with a metallic piece (not shown) embedded therein, which a proximity detector 10 (FIG. 3) in the card reader detects to produce a signal. The card must be inserted into a proper position in the slot 5, and when it is in that position, a switch (not shown) may be closed to produce a signal on a line 100.

In the following description, a signal and the line on which it appears will often be designated by the same reference numerals for simplicity of description. For example, the signals on the lines 100, 102, etc. will sometimes be referred to as signals 100, 102, etc., respectively. It may also be mentioned here that the system of the invention employs various logic elements such as NOT, AND, OR, INHIBIT, MEMORY elements. When these elements produce an output signal, the output signal will be referred to as being "1" or the elements, as producing an output signal "1," while when there is no output, the condition will be referred to as "0" or the elements, as producing an output signal "0." With respect to the MEMORY elements (flip-flops), they have a "1" section and a "0" section, and the input to the "0" section will be referred to as "a set input"; the input to the "1" section, as "a reset input"; the output from the "0" section, as "a set output"; and the output from the "1" section, as "a reset output." While the set input is "0," the set output is "0" and the reset output is "1." When the set input becomes "1," the output conditions are reversed, that is, the set output becomes "1" and the reset output, "0." Under the condition, when the reset input becomes "1," the output conditions are again reversed so that the original output conditions are restored.

When the proximity detector 10 detects the metallic piece of an inserted card, with the signal 100 being "1," the inputs to NOT elements 11 and 12 both become "1," so that the output signal of an OR element 13 becomes "0." This causes a NOT element 14 to produce a signal "1," which is applied through a differential circuit 15, an OR element 16 and an amplifier 17 to a solenoid 18 to energize the same. The solenoid, when energized, is used to lock the inserted card in the proper position in the slot 5 on the one hand, and close a contact 19, on the other, so that a signal "1" is applied through a differential circuit 20 to the "0" section of a flip-flop 21, whereupon the set output thereof becomes "1," which is applied through the OR element 16 and the amplifier 17 to the solenoid 18, thereby to hold its energization. On the other hand, the reset output of the flip-flop 21 becomes "0," so that one of the two input signals to an OR element 22 is "0," and with the other input signal being also "0" at this time, a NOT element 23 produces an output signal "1" to be applied through a line 101 to an identification number collating circuit 201.

The circuit 201 is so arranged that when it receives the signal "1" on the line 101, it produces a signal "1" on either one of its two output lines 105 and 106, depending upon a signal "1" applied from a line 104. The signal 104 corresponds to the identification number on the inserted card, and if it is one of the numbers registered, the signal 105 becomes "1," but if it is not, the signal 106 becomes "1."

Figure 4:
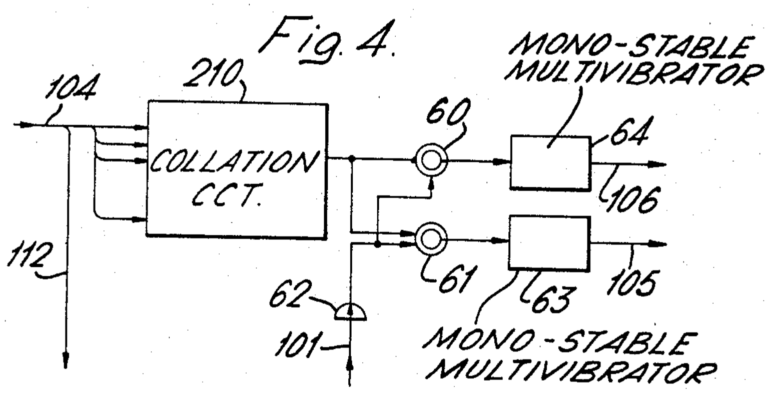
FIGS. 4 and 5 are detailed circuit diagrams of what are shown as a single block in FIG. 3.

As shown in detail in FIG. 4, the circuit 201 includes a memorizing circuit 210 comprising a well known diode-matrix wherein the identification numbers of all the employees are memorized. When the identification number of an inserted card applied as the signal 104 to the circuit 210 is valid, the circuit 210 produces a signal "1," which is applied to the inhibit terminal of an INHIBIT element 60 and also to one of the two input terminals of an AND element 61. The signal 101 previously mentioned is applied as an input signal to the elements 60 and 61 with a certain time delay caused by a timer 62. The result is that if the output signal of the circuit 210 is "1," that of the INHIBIT element 60 is "0," but the AND element 61 produces a signal "1," which triggers a mono-stable multivibrator 63 to produce the signal 105. On the contrary, if the output signal of the circuit 210 is "0," the signal 101 is applied through the INHIBIT element 60 to trigger a second mono-stable multivibrator 64 to produce the signal 106.

The signal 105 is applied as an input to an INHIBIT element 24, a clock 202 is so arranged that its output signal 108 remains "1" during the working hours, and "0" before or after the working hours. When the signal 108 is "0," the output of an OR element 30 is "0," so that a NOT element 31 produces an output signal "1," which is applied through an OR element 32 to the inhibit terminal of an INHIBIT element 24. Under the condition, the output signal of the element 24 is "0."

When the signal 105 is "1," an OR element 26 produces an output signal "1" to be applied through a NOT element 27 and a NOT amplifier 28 to the lamp 7 (FIG. 2) to turn it on, thereby indicating that the inserted card is valid. The output 107 of the NOT amplifier 28 may also be utilized to open the gate (not shown) to permit passage of the employee therethrough. The signal 105 is a pulse of short duration, so that it will soon become "0," whereupon the output of the NOT element 27 changes from "0" to "1," thereby deenergizing the lamp 7 through the NOT amplifier 28. The signal "1" from the NOT element 27 is applied through a differential circuit 33 to an OR element 34 to render its output signal "1," which is applied through an OR element 35 as a reset input to the flip-flop 21, whereupon its set output is rendered "0," thereby deenergizing the solenoid 18.

Upon deenergization, the solenoid 18 releases the lock on the inserted card so as to be returned to its owner. Thus, the employee may pass through the gate. A human detector (not shown) may be provided to close the gate after him.

When an invalid identification card (which bears no number or a number not registered) has been inserted, the signal 106 becomes "1," which is applied through the OR elements 34 and 35 as a reset input to the flip-flop 21, so that the solenoid 18 is deenergized to release the locked card to be returned to the bearer. On the other hand, the flip-flop 25 remains reset, thereby maintaining the "0" condition of the signal 107 and consequently the gate closed.

Figure 5:
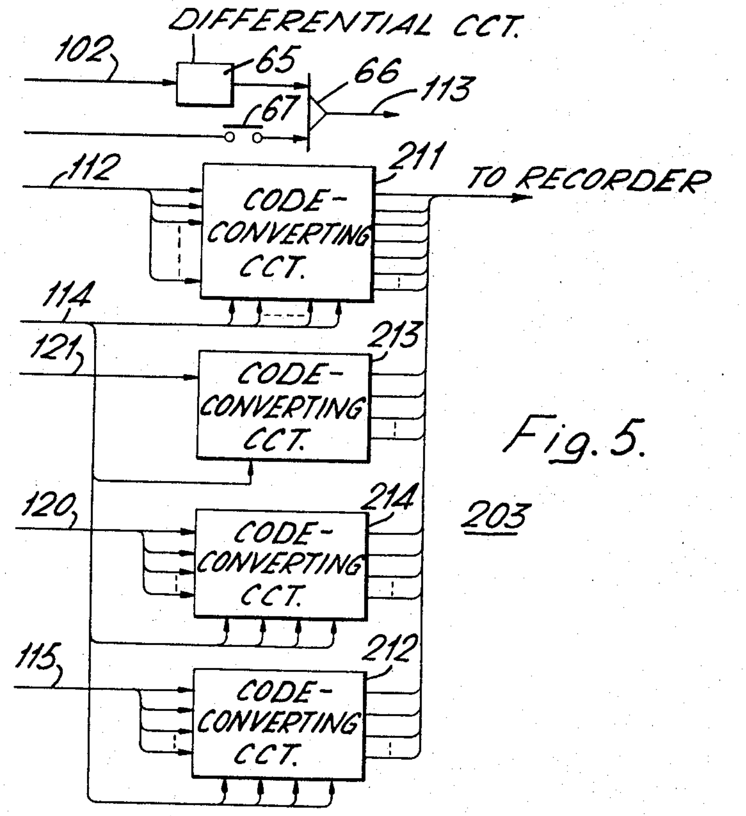

In case an employee comes to work later or leaves work earlier than usual, he inserts his identification card only into the slot 5 of the card reader as in the previous case. During the working hours, the clock 202 is maintaining the signal 108 "1," as previously mentioned. If the card inserted is a valid one, the signal 105 becomes "1" as previously mentioned. The signal 108 is applied through the OR element 30 to the NOT element 31, so that its output to be applied to the OR element 32 is "0" and, with another input signal 109 being "0" at this time, the inhibit signal to the INHIBIT element 24 is "0." Consequently, upon receipt of the signal 105, the INHIBIT element 24 applies a set input to the flip-flop 25, so as to render its set output signal 102 "1." The signal 102 is applied to a recording control circuit 203. As shown in FIG. 5, the signal 102 is applied through a differential circuit 65 to an OR element 66, which produces one pulse on a line 113 to be applied to a pulse counter 204, the output terminals of which are connected by a cable 114 to the recording control circuit 203. On the other hand, the collation circuit 201 applies to the circuit 203 a signal 112 corresponding to the identification number of an inserted card. The signal 112 is scanned by the output pulses of the counter 204, so that the circuit 203 produces a corresponding signal to be applied to a recorder 205, where the identification number is recorded in the form of punched holes or printed symbols.

The details of the circuit 203 are shown in FIG. 5. When the signal 102 comes into the circuit 203, a first pulse is applied to the counter 204 via the line 113, whereupon its output at the first output terminal 114–1 becomes "1," which is applied as a scanning pulse to a code conversion circuit 211. Here, a signal corresponding to the figure, for example, in the first place of the identification number of a card inserted, is already applied via line 112. As a result, the signal is code-converted and applied to the recorder 205 where that figure is recorded. In response to the recording operation, a synchronous switch 67 is closed for a fraction of a second, thereby causing the signal 113 to momentarily become "1" again, and the output of the counter 204 to be shifted to the next output terminal 114-2. On the other hand, a signal on the line 112 corresponding to the figure in another place of the identification number is already applied to the circuit 211. The signal is code-converted therein and applied to the recorder 205 where that figure is recorded. Thus, the identification number of a card inserted is recorded by the recorder.

While the identification number is being recorded, the clock 202 produces a signal on a line 115 corresponding to the instant time, which signal is applied to a code-converting circuit 212 in the circuit 203 and recorded in by the recorder 205 in the same manner as described above.

The last output terminal 116 of the counter 204 is connected to one of the inputs of the OR element 34, so that when the counter has completed one cycle of its counting operation, the signal 116 resets the flip-flops 21 and 25 thereby to restore the original condition of the system. The resetting of the flip-flops 21 and 25 results in deenergization of the solenoid 18 to release the lock on the inserted card and turning out of the lamp 7, and the employee is free to pass through the gate, with the necessary data having been recorded by the recorder.

If an employee exits through the gate on business during the working hours, the gate is simply opened and no recording is made since the exit is justified and no corresponding reduction is made in the payroll calculations.

Such an employee is given a reason card in addition to his identification card. When he passes the gate, he first inserts the reason card into the slot 4 of the card reader 3. The card has a piece of metal embedded therein as a test of its genuineness. When the card is inserted into a proper position in the slot 4, a signal appears on a line 117 to be applied to a NOT element 38, and a proximity detector 36 detects the metallic piece in the card to produce an output signal to be applied to a NOT element 37. As a result, the output of the two NOT elements and consequently that of an OR element 39 becomes "0," so that a NOT element 40 produces a signal "1" to be applied to one of the two inputs of an AND element 41. As previously mentioned, the reason card has necessary information recorded therein in the form of coded punched holes, upon detection of which a corresponding signal is applied through a line 118 to one of the two inputs of an AND element 42. With the reason card being in the slot 4, the identification card is subsequently inserted into the slot 5, whereupon the contact 19 is closed, as previously mentioned, and the other input terminal of the AND element 41 is momentarily energized through the differential circuit 20 to produce an output signal, which is applied as a set input signal to a flip-flop 43 to render its set output "1." This signal energizes a solenoid 45 through an amplifier 44, whereupon the inserted reason card is locked in that position. The set output of the flip-flop 43 is also applied to the other input of the AND element 42 to render its output signal 109 "1," so that the signal 102 remains "0" Therefore, no recording operation will be conducted.

When the identification card was inserted, the signal 101 became "1" as previously mentioned, so that the identification number of the card is collated in the circuit 201, and if it is proper valid, the gate is opened in the manner previously mentioned to permit passage therethrough.

The signal 109 is also applied through an OR element 46 to a NOT element 47, which produces a signal "0" to be applied to one of the two inputs of an OR element 48. When the checking of the identfiication number has been finished, the flip-flop 21 is reset as previously mentioned, so that its reset output signal is applied to the other input of the OR element 48, the output of which is applied through a differential circuit 49 to a mono-stable multivibrator 50, the output of which energizes a solenoid 52 through an amplifier 51. The solenoid 52, when energized, actuates a mechanism (not shown) to draw in the inserted reason card so that it cannot be fraudulently used again by any other person. Mention has already been made that when an inserted identification card has been recognized as a genuine, the signal 105 becomes "1." When the signal is restored to "0" upon completion of the collation of the identification number, the flip-flops 21 and 43 are both reset.

In case an employee passes the gate after an overtime work, he first inserts into the slot 4 a reason card for overtime work, in which the necessary data such as the number of hours of the overtime work he made are recorded by coded punched holes. When the card is placed at the proper position in the slot 4 and recognized as being genuine, both the output signal of the proximity detector 36 and the signal 117 become "1" just as when a reason card for a business outing was inserted. On the other hand, upon recognition of the reason card for overtime work as such, a signal "1" appears on a line 119 to be applied to the AND element 53 and at the same time the coded punched holes in the card expressing the number of hours of the overtime work are read so that a corresponding signal is applied through a line 120 to the recording control circuit 203. When an identification card is subsequently inserted, the signal 101 becomes "1," so that the identification number of the card is checked by the circuit 201 in the same manner as previously mentioned. On the other hand, the set output of the flip-flop 43 is applied to the AND element 53, the output of which is applied through a line 121 to the recording control circuit 203. Thus, as in the case of late coming to work or early leaving work, the employee identification number is first recorded, and as the counter 204 progresses, the signals 120 and 121 are applied to the code-converting circuits 214 and 213, respectively, of the circuit 203 so that the reason being overtime work and the number of hours of the overtime work are recorded by the recorder 205.

What we claim is:

1. A recording control apparatus adapted to be installed at an entrance and exit of an office and the like to record various items of information about the passage of employees therethrough; said apparatus using employee identification cards each having an employee identification number recorded thereon as coded information, and reason cards of different kinds each having a reason that justifies unusual passage through said entrance and exit and other items of information recorded thereon as coded information; and comprising: card genuineness detecting means for testing the genuineness of an identification card and a reason card; card reader means for reading said informations on said cards; recording means for recording said informations that have been read by said reading means; control circuit means interconnecting said detecting means and said reader means with said recording means for detecting the kind of said reason card to determine whether said recording means is to record the identification number of said identification card, said control circuit means including means for controlling said recording means to record said information on said reason card when said recording means is to record said identification number.

2. The apparatus as set forth in claim 1, and including: time signal generating means coupled to said recording means by said control circuit means, said control circuit means further including means for controlling said recording means so that when said genuineness detecting means receives only an identification card during a predetermined period of time, said recording means records the identification number of said identification card and the instant time signal from said time signal generating means when said identification card has been received.

3. The apparatus as set forth in claim 1, and including: time signal means coupled to said recording means by said control circuit means, said control circuit means further including means responsive to said detecting means and to said reader means for controlling said recording means so that when said genuineness detecting means receives only an identification card outside a predetermined period of time, said recording means conducts no recording operation.

References Cited

UNITED STATES PATENTS

| | | | |
|---|---|---|---|
| 2,988,269 | 6/1961 | Reichert | 346—50 X |
| 3,154,761 | 10/1964 | O'Gorman | 340—149 |
| 3,341,852 | 9/1967 | Kramer et al. | 346—53 X |

RICHARD B. WILKINSON, *Primary Examiner.*

JOSEPH W. HARTARY, *Assistant Examiner.*

U.S. Cl. X.R.

340—149; 346—53